United States Patent
Lundin et al.

(10) Patent No.: US 10,176,544 B2
(45) Date of Patent: Jan. 8, 2019

(54) SYSTEM AND METHOD FOR PRESENTING USER PROGRESS ON PHYSICAL FIGURES

(71) Applicant: Intellifect Incorporated, San Francisco, CA (US)

(72) Inventors: John A. Lundin, San Francisco, CA (US); Daniel A. Westfall, San Francisco, CA (US)

(73) Assignee: Intellifect Incorporated, San Franciso, CA (US)

( * ) Notice: Subject to any disclaimer, the term of this patent is extended or adjusted under 35 U.S.C. 154(b) by 0 days.

(21) Appl. No.: 15/824,642

(22) Filed: Nov. 28, 2017

(65) Prior Publication Data

US 2018/0082395 A1    Mar. 22, 2018

Related U.S. Application Data

(63) Continuation of application No. 13/912,983, filed on Jun. 7, 2013, now Pat. No. 9,836,806.

(51) Int. Cl.

| | | |
|---|---|---|
| *G06T 1/00* | (2006.01) | |
| *G06T 11/60* | (2006.01) | |
| *G06T 19/00* | (2011.01) | |
| *G06T 11/00* | (2006.01) | |

(52) U.S. Cl.
CPC ............... *G06T 1/00* (2013.01); *G06T 11/60* (2013.01); *G06T 19/00* (2013.01); *G06T 11/00* (2013.01); *G06T 2219/004* (2013.01)

(58) Field of Classification Search
CPC . G06T 1/00; G06T 11/60; G06T 11/00; G06T 19/00
See application file for complete search history.

(56) References Cited

U.S. PATENT DOCUMENTS

| | | |
|---|---|---|
| 4,075,782 A | 2/1978 | Neuschatz |
| 5,312,287 A | 5/1994 | Chuang |
| 5,766,077 A | 6/1998 | Hongo |
| 6,193,577 B1 | 2/2001 | Kaplan |
| 6,213,872 B1 | 4/2001 | Harada et al. |
| 6,290,565 B1 | 9/2001 | Galyean, III et al. |
| 7,131,887 B2 | 11/2006 | Hornsby et al. |
| 7,217,192 B2 | 5/2007 | Nishiyama |
| 7,244,124 B1 | 7/2007 | Merrill |
| 7,244,183 B1 | 7/2007 | England |
| 7,568,963 B1 | 8/2009 | Atsmon et al. |
| 7,591,703 B2 | 9/2009 | Zielinski et al. |
| 7,663,648 B1 | 2/2010 | Saldanha et al. |
| 7,946,919 B2 | 5/2011 | Piccionelli |
| 8,033,901 B2 | 10/2011 | Wood |

(Continued)

*Primary Examiner* — Tapas Mazumder
(74) *Attorney, Agent, or Firm* — Donn K. Harms

(57) ABSTRACT

A system, method, and a physical figure for presenting user progress in a virtual space are disclosed. The presented user progress may indicate user advancements in the virtual space and/or user development in the real-world. Based on information indicating such user progress, character representation may be determined to reflect the user progress for presentation on the physical figure. In some implementations, specific location(s) on the physical figure may be determined for presenting specific aspect(s) of user progress in the virtual space. The physical figure may receive the determined character representation information and present the character represent on one or more screens thereon.

10 Claims, 5 Drawing Sheets

(56) References Cited

U.S. PATENT DOCUMENTS

| | | |
|---|---|---|
| 8,062,089 B2 | 11/2011 | Hardin et al. |
| 8,137,151 B2 | 3/2012 | Kenney |
| 8,292,689 B2 | 10/2012 | Hardin et al. |
| 8,401,912 B2 | 3/2013 | Ganz et al. |
| 8,469,766 B2 | 6/2013 | Zheng |
| 8,591,302 B2 | 11/2013 | Raichman et al. |
| 8,675,017 B2 | 3/2014 | Rose et al. |
| 8,790,180 B2 | 7/2014 | Barney et al. |
| 8,795,072 B2 | 8/2014 | Borst et al. |
| 8,926,395 B2 | 1/2015 | Zheng |
| 8,939,840 B2 | 1/2015 | Heatherly et al. |
| 8,990,715 B1 | 3/2015 | Harp et al. |
| 8,996,429 B1 | 3/2015 | Francis, Jr. et al. |
| 9,180,378 B2 | 11/2015 | Reiche |
| 9,446,319 B2 | 9/2016 | Barney et al. |
| 9,480,929 B2 | 11/2016 | Weston |
| 9,526,979 B2 | 12/2016 | Scott et al. |
| 9,610,500 B2 | 4/2017 | Colbert |
| 9,691,298 B1 | 6/2017 | Hsu-Hoffman et al. |
| 9,703,896 B2 | 7/2017 | Zhang et al. |
| 2003/0044758 A1 | 3/2003 | Ray |
| 2004/0161732 A1 | 8/2004 | Stump et al. |
| 2005/0059483 A1 | 3/2005 | Borge |
| 2005/0215171 A1 | 9/2005 | Oonaka |
| 2005/0278643 A1 | 12/2005 | Ukai et al. |
| 2006/0223637 A1 | 10/2006 | Rosenberg |
| 2007/0018390 A1 | 1/2007 | Sumner et al. |
| 2007/0073436 A1* | 3/2007 | Sham .............. G06Q 30/02 700/164 |
| 2007/0207698 A1 | 9/2007 | Stanley |
| 2007/0239479 A1 | 10/2007 | Arrasvuori et al. |
| 2008/0139080 A1 | 6/2008 | Zheng |
| 2008/0147502 A1 | 6/2008 | Baker |
| 2008/0287033 A1* | 11/2008 | Steinberg .............. A63H 3/28 446/297 |
| 2009/0053970 A1 | 2/2009 | Borge |
| 2009/0077046 A1* | 3/2009 | Narahara .......... G06F 17/30038 |
| 2009/0081923 A1 | 3/2009 | Dooley et al. |
| 2009/0100351 A1 | 4/2009 | Bromenshenkel et al. |
| 2009/0124165 A1 | 5/2009 | Weston |
| 2009/0137323 A1 | 5/2009 | Fiegener et al. |
| 2009/0158210 A1 | 6/2009 | Cheng et al. |
| 2009/0221374 A1 | 9/2009 | Yen et al. |
| 2009/0234919 A1* | 9/2009 | Jefremov ............ H04L 43/0894 709/204 |
| 2010/0069148 A1 | 3/2010 | Cargill |
| 2010/0093434 A1 | 4/2010 | Rivas |
| 2010/0125028 A1 | 5/2010 | Heppert |
| 2010/0172287 A1 | 7/2010 | Krieter |
| 2010/0274902 A1 | 10/2010 | Penman et al. |
| 2010/0328319 A1 | 12/2010 | Ikenoue |
| 2011/0014842 A1 | 1/2011 | Rappaport-Rowan |
| 2011/0021109 A1 | 1/2011 | Le et al. |
| 2011/0028219 A1 | 2/2011 | Heatherly et al. |
| 2011/0124264 A1 | 5/2011 | Garbos |
| 2011/0190047 A1 | 8/2011 | Ganz |
| 2011/0213197 A1 | 9/2011 | Robertson et al. |
| 2011/0230114 A1 | 9/2011 | Du Preez et al. |
| 2011/0234756 A1 | 9/2011 | Adler et al. |
| 2011/0269365 A1 | 11/2011 | Goff et al. |
| 2011/0312418 A1 | 12/2011 | Page |
| 2012/0040763 A1 | 2/2012 | Auterio et al. |
| 2012/0094767 A1 | 4/2012 | Presgraves |
| 2012/0142429 A1 | 6/2012 | Muller |
| 2012/0221418 A1 | 8/2012 | Smith |
| 2012/0271143 A1 | 10/2012 | Aragones et al. |
| 2013/0017891 A1 | 1/2013 | Romero et al. |
| 2013/0150155 A1 | 6/2013 | Barney et al. |
| 2013/0165234 A1 | 6/2013 | Hall et al. |
| 2013/0238392 A1* | 9/2013 | Sloan ............... G06Q 30/0201 705/7.29 |
| 2013/0257877 A1 | 10/2013 | Davis |
| 2013/0288563 A1 | 10/2013 | Zheng et al. |
| 2013/0309641 A1 | 11/2013 | Sawyer et al. |
| 2014/0030955 A1 | 1/2014 | Smetanin et al. |
| 2014/0227676 A1 | 8/2014 | Noshadi et al. |
| 2015/0004584 A1 | 1/2015 | Galibois et al. |
| 2015/0077234 A1 | 3/2015 | Fullam |
| 2015/0080121 A1 | 3/2015 | Garlington et al. |
| 2015/0336016 A1 | 11/2015 | Chaturvedi |
| 2015/0375134 A1 | 12/2015 | Zhang et al. |
| 2016/0067593 A1 | 3/2016 | Yim et al. |
| 2016/0140867 A1 | 5/2016 | Aragones et al. |
| 2016/0144283 A1 | 5/2016 | Martin et al. |
| 2016/0325180 A1 | 11/2016 | Nelson et al. |

* cited by examiner

SYSTEM AND METHOD FOR PRESENTING USER PROGRESS ON PHYSICAL FIGURES

CROSS-REFERENCE TO RELATED APPLICATIONS

The present application is a continuation of U.S. patent application Ser. No. 13/912,983, entitled "SYSTEM AND METHOD FOR PRESENTING USER PROGRESS ON PHYSICAL FIGURES," filed Jun. 7, 2013, the contents of which are hereby expressly incorporated by reference in their entirety.

FIELD OF THE INVENTION

The invention relates to presenting user progress in a virtual space, the presentation being character representation on physical figures associated with the users based on user progresses in the virtual space and/or in the real-world.

BACKGROUND OF THE INVENTION

Systems that present a virtual space character on client computers to reflect development in the virtual space by the character are known. In those systems, aspects of a character's physical appearance including age, facial features, skin color or abnormalities, the character's pose, and/or the character's costume including clothing, armor, or accessories may be presented on client computers in ways to represent the character's development in the virtual space.

SUMMARY

One aspect of the disclosure relates to facilitating presentation of user progress in a virtual space on physical figures associated with the users. The physical figures may include, but are not limited to, action figure toys, robots, dolls, mannequins, automata, and/or any other physical figures that may be used to present information indicating user progress in the virtual space. The presentation may include presenting an image, art, video, animation, audio, text and/or any character representation information that reflects and/or describes progress of a user associated with the character in the virtual space on a physical figure associated with the user. In some implementations, for determining character representation information, the user progress may be determined based on real-world experiences of the user. In those implementations, the user progress in the virtual space may be determined based on user achievements in social relationships, physical activities, learning experiences, emotional experiences and/or any other real-world experiences of the user and may be presented on different parts of the physical figure. This may encourage users to advance in the virtual space and/or develop in the real-world and thus facilitate user growth.

In some implementations, a system configured to facilitate presentation of user progress in a virtual space on physical figures associated with the users may include one or more processors configured to execute one or more computer program modules. The one or more computer program modules may include one or more of a space module, a user module, a character representation module, and/or other modules.

In some implementations, a physical figure configured to present user progress in a virtual space may include a torso piece, a head piece, arm pieces, leg pieces, a processing unit, one or more display screens, and/or other components.

Space module may be configured to execute an instance of a virtual space. The space module may implement the instance of the virtual space to facilitate user interaction with the virtual space by executing user actions within the virtual space. Within the virtual space, objectives that define state, levels, points, and/or any other milestones in the virtual space and/or in the real-world may be provided to users. In some implementations, the real-world objectives may be provided to help the users to develop in real-world areas, such as but not limited to, physical abilities, knowledge, skills, social relationships, emotion, health, and/or any other areas related to the well-being of the user in the real-world. For motivating, encouraging and/or recognizing user achievements of the objectives provided in the virtual space (i.e., virtual space objectives and/or real-world objectives), virtual space rewards may be given to the users upon their completion of the objectives. To achieve the objectives, users may be facilitated to interact with one another in the virtual space and/or the real world). The facilitated interactions may include collaboration, group activity or activities, competition, and/or any other social interactions facilitated by the virtual space. For example, for such facilitations, teams may be established in the virtual space by the users, provider, administrator, moderator, and/or any other entities related to the virtual space. Members on the same team may collaborate by coordinating their actions, assisting one another, dividing goals and/or objectives between them, relying upon each other's abilities, skills, knowledge, resources and/or any other user characteristics, and/or engage in any other collaborative actions in the virtual space and/or in the real-world to achieve objectives provided in the virtual space.

The user module may be configured to manage user accounts associated with the individual users. User accounts may include information indicating individual user progresses in the virtual space and/or in the real-world. The progress information may indicate user advancements towards an over-arching objective in the virtual space and/or in the real-world—e.g., a number of sub-objectives completed and a number of sub-objectives yet to be completed by the user. The progress information may indicate a percentage of completion of objectives, missions, quests, campaign, scenarios, and/or a number of points, levels or score that have been gained by the user in the virtual space. The progress information may indicate specific skills, abilities, clues, virtual items and/or any other virtual space elements that have been acquired by the user in the virtual space. In some examples, the progress information may indicate user development in the real-world, such as but not limited to, specific physical activities, real-world skills, knowledge, social relationships, emotional experiences, and/or any other real-world experiences by the user. In some implementations, the progress information about individual users may be divided into different categories to distinguish user advancement and/or development in different areas within the virtual space and/or within the real-world. For example, social points may be tabulated for user developments in real-world social relationships, physical points may be tabulated for user developments in real-world physical activities, learning points may be tabulated for user developments in real-world learning skills, knowledge, abilities and so on.

The character representation module may be configured to determine character representation information for presentation on physical figure associated with individual users based on the user progress information managed by the user module. The physical figures may include, but not limited to, action figure toys, robots, dolls, mannequins, automata, and/or any other physical figures that may be used to present character representation information indicating user progress in the virtual space. The determined character representation information may include information that facilitates presenting various aspects of user progress in the virtual space on a physical figure associated with a user. For example, such character representation information may include information regarding graphical art (2D and/or 3D), still image, movie, animation, audio, text, and/or any other character representation information. The character representation presented on a physical figure as facilitated by the character representation information may include character's physical appearance, verbal communications, character description and/or any other character representation presentable on the physical figure. The character representation module may be configured to determine specific character representation that should correspond to an aspect of a user progress. In some implementations, the character representation module may be configured to determine specific location(s) where the determined character representation information may be presented specifically on the physical figure associated with the user. In some implementations, the character representation module may be configured to determine the character representation information for presentation on the physical figure based on information indicating presentation capability of the physical figure.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
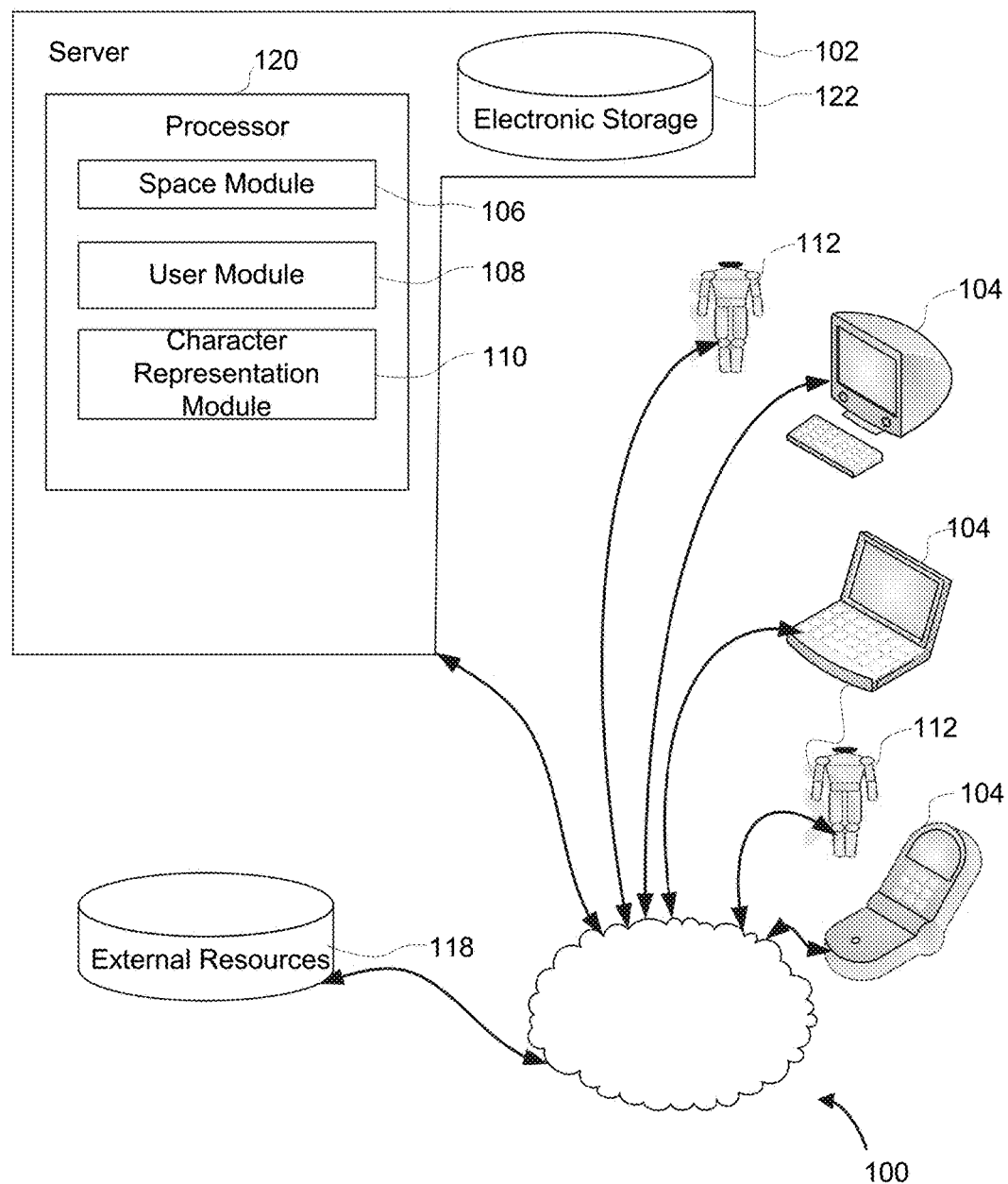
FIG. 1 illustrates a system configured to present user progress on a physical figure.

FIG. 1 illustrates a system 100 configured to present user progress in a virtual space on a physical figure 112. The user progress may be related to user advancements in a virtual space and/or the real world. Character representation information, such as, but not limited to, graphical art (2D or 3D), still images, video, audio, animation, text and/or any other character representation information that may be determined for representing user progress in the virtual space. Such determined character representation may be presented on different parts of physical figures 112 associated with the users. The character representation presented on a physical figure 112 may include a character's physical appearance, verbal communications, character description and/or any other character representation presentable on the physical figures 112. This may provide encouragement for users to develop in the virtual space and/or in the real-world.

In some implementations, system 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a space module 106, a user module 108, a character representation module 110, and/or other modules. The character representation information determined by the server 102 via the character representation module 110 may be transmitted to physical figures 112 for presentation.

Space module 106 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 106 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

The user may participate in the instance of the virtual space by initiating actions in the virtual space. In some implementations, the actions may be enabled by physical controls provided by the client computing platforms 104, such as but not limited to, play buttons, joysticks, motion sensors, cameras, keyboards, mouse, and/or any other physical controls provided by client computing platforms 104. In some implementations, the actions may be enabled by controls provided by graphical user interface (GUI) implemented on client computing platforms 104, such as but not limited to, graphics, menus, dialog boxes, forms, sliding bars, buttons, radio box, tabs, and/or any other controls provided by the GUI. In any case, as so enabled to initiate actions in the virtual space, the user may provide inputs to initiate virtual space maneuvers, to participate in virtual activities and/or engage in other interactions within the virtual space. For example, user may provide an input specifying an amount of troops to be marched to a virtual space location when defending that virtual space location. Commands may be generated for the user initiated actions and may be executed by the space module 106 in the virtual space such that the user requested interactions with the virtual space may be effectuated in the virtual space following the execution. Execution of such a command by the space module 106 may produce changes to the virtual space state, which may reflect user progresses and/or results of the user initiated actions.

Within the instance of the virtual space, rules may be implemented by the space module 106. The virtual space rules may be set up, for example, to limit users' range of actions and/or interactions while participating in the virtual space, to enforce certain actions, to describe an order or orders in which actions should be taken, and/or to set up or enforce any other desirable regulations within the virtual space. By way of non-limiting examples, virtual space rules may be established for relationships between users within the same team, from different teams, alliances, role classes, races, countries, states, provinces, for research orders, religion progression, character progression, military force advancement, upgrade orders, trade terms, treaty terms, loans, for user eligibility to undertake mission, quest, campaign, for user's ability to engage with other virtual space entities and/or for any other components provided by the virtual space. In some examples, such virtual space rules may be predetermined at a configuration stage of system 100, while in some other examples such virtual space rules may evolve dynamically as the virtual space progresses. In some examples, user may be facilitated to program their own variant virtual space rules that may be incorporated in the virtual space rules.

Within the instance of the virtual space, virtual space objectives may be provided for users to interact with the virtual space. The virtual space objectives may be determined by provider, administrator, moderator, and/or any other entities related to the virtual space to define virtual space states, levels, points, and/or any other milestones which the users should try to achieve through their actions and/or through interactions with other virtual space entities. The virtual space objectives may include sub-objectives which may be completed to further achievements of the over-arching objectives. In some implementations, users may be facilitated to specify objectives for other users, for example, to cooperate with the objective specifying users in activities, missions, quests, campaigns in the virtual space, to assist the objective specifying users, to compete against the objective specifying users, and/or to engage with virtual space and/or the objective specifying users in any other manners as desired.

In some implementations, within the virtual space, real-world objectives may be provided to users. For example, the real-world objectives may be provided to help the users to develop in real-world areas, such as but not limited to, physical abilities, knowledge, skills, social relationships, emotion, health, and/or any other areas related to the well-being of the user in the real-world. For instance, the user may be provided with a real-world objective to plant a tree, to develop a social relationship, to learn a skill, to acquire knowledge, to perform a physical activity and/or any other real-world objectives.

For motivating, encouraging and/or recognizing user achievements of objectives provided in the virtual space (i.e., virtual space objectives and/or real-world objectives), virtual space rewards may be given to the users upon their completion of the objectives. In some examples, the given virtual space rewards may affect the state of the virtual space. For examples, rewards such as unlocked items, improved abilities, new skills, virtual currencies and the like may give the rewarded user new abilities and/or actions to interact with the virtual space and/or other users in ways that the user was not able to before the rewards was given to the user. The given rewards may be aesthetic and decorative. For example, accessories such as medal, badge, body armor, outfit, tattoo, shoulder pads, shoes, and/or any other accessories may be given to the user for recognition of achievements by the user in the virtual space and/or in the real-world. For instance, a first badge or award may be given to the user for completing a difficult quest in the virtual space;

and a second badge or award may be given to the user for completing the quest in a record time or multiple quests of a particular theme (e.g. helping the environment).

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The characters may include user characters and non-user characters. As used herein, the term "user character" may refer to an object (or group of objects) present in the virtual space that represents an individual user. On the other hand, the non-user characters may not be associated with any user in the virtual space and may be controlled by artificial intelligence provided by the system 100. The user character may be controlled by the user, with whom it is associated. The user character may move through and interact with other elements in the virtual space (e.g., non-user characters, other virtual space objects and/or the topography). The user may initiate maneuvers to direct the movements of the user character in the virtual space. The user character may be created and/or customized by the user associated with user character.

Within the instance of the virtual space, the user characters may develop for improvements and/or losses in skills, knowledge, abilities, power, personality, physical appearance, intelligence, pose, accessories, and/or any other characteristics of the characters. User character development may be achieved by the user through interactions with the virtual space. For example, a user character may develop (e.g., through virtual space rewards) when the user through the user character achieves a goal, an objective, a virtual space level, a number of experience points, a score, a skill and/or any other virtual space milestones. In some examples, the user character may develop simply because of one or more rewards gratuitously collected by the user. In any case, the user character development may be pre-planned by the provider, administrator, moderator, and/or any other entities related to the virtual space at a configuration stage of the system 100. For example, the pre-planned character development may specify that a user character will have an ability to connect with an X number of other users in the virtual space when the user character gains 100 experience points in the virtual space; such an ability will increase by connecting with 10 more other users when the user gains another 100 experience points; and so on. Simultaneously or alternatively, the user character development may be determined dynamically at runtime of system 100 by the provider, administrator, moderator, and/or any other entities related to the virtual space.

The development of a user character typically results in progress in the virtual space by the user character. However this is not necessarily the only case. In some examples, the user character development may result in, for example, skill and/or ability losses in the virtual space by the user character (e.g., the user character may lose a skill given for protecting the user character only when the user character has a very low experience level in the virtual space—i.e., a new user protection). In any case, the development of the user character may affect the user character's ability to change the state of virtual space. For example, as the user character develops in the virtual space by gaining new skills and/or abilities, the user character may be able to interact with other users, non-user characters, virtual space objects, and/or any other virtual space elements in ways that the user character was not able to before the development. For instance, a user character may be able to establish friendship with 5 other user characters when the user character gains a new social skill in the virtual space. As another example, a user might unlock the ability to go on a team quest with other compatible users.

Within the instance of the virtual space executed by space module 106, the users may be facilitated to interact with one another. The facilitated interaction between the users may include collaboration, group activity or activities, competition, and/or any other social interactions between the users facilitated by the virtual space. For example, for such facilitations, teams may be established in the virtual space by the users, provider, administrator, moderator, and/or any other entities related to the virtual space. Members on the same team may collaborate by coordinating their actions, assisting one another, dividing goals and/or objectives between them, relying upon each other's abilities, skills, knowledge, resources and/or any other user characteristics, and/or engage in any other collaborative actions in the virtual space and/or in the real-world, e.g., to achieve objectives provided in the virtual space. Teams may compete against each other to achieve an objective provided in the virtual space (i.e. a virtual space objective and/or real-world objective) first. A team may have rules of conduct which team members agree to obey and/or one or more shared agendas.

The user module 108 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information indicating user progress in the virtual space and/or in the real-world, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The progress information about individual users managed by the user module 108 may indicate and/or quantify advancements and/or developments of the users in the virtual space and/or in the real-world. The progress information may indicate user advancements towards an overarching objective in the virtual space and/or in the real-world—e.g., a number of sub-objectives completed and a number of sub-objectives yet to be completed by the user. The progress information may indicate a percentage of completion of objectives, missions, quests, campaign, scenarios, and/or a number of points, levels or score that have been gained by the user in the virtual space. The progress information may indicate specific skills, abilities, clues, virtual items and/or any other virtual space elements that have been acquired by the user in the virtual space. In some examples, the progress information may indicate user development in the real-world, such as but not limited to, specific physical activities, real-world skills, knowledge, social relationships, emotional experiences, and/or any other real-world experiences by the user.

In some implementations, the progress information about individual users may be divided into different categories to distinguish user advancements in different areas within the virtual space and/or within the real-world. For examples, social points may be tabulated for user real-world experiences in social relationships, physical points may be tabulated for user real-world experiences in physical activities, learning points may be tabulated for user real-world experiences in learning skills, knowledge, abilities and so on.

The character representation module 110 may be configured to determine character representation information for presentation on physical figures 112 associated with individual users based on the user progress information managed by the user module 110. The determined character representation information may include information that facilitates presenting various aspects of user progress in the virtual space on a physical figure 112 associated with the user. For example, such character representation information may include information regarding graphical art (2D and/or 3D), still image, movie, animation, audio, text, and/or any other character representation information. In some examples, the determined character representation information may be readily presented on the physical figure 112 associated with the user. That is, in those examples, the determined character representation information may be the rendered graphical art, still image, movie, animation, audio, or the text and may be streamed to the physical figure 112 for presentation. In some examples, the determined character representation information may include instructions, model information, path information and/or any other facilitating information for the physical figure 112 and/or the client computing platform 104 associated with the physical figure 112 to render the graphical art, still image, movie, animation, audio, or the text for presentation on the physical figure 112.

In any case, the character representation presented on a physical figure 112 as facilitated by the character representation information determined by the character representation module 110 may include a character's physical appearance including gender, age, facial features (including hair and eye color), body type (e.g., height, size, muscular, flabby, angular, round, and etc.), skin color, health, abnormalities, distinctive physical characteristics (e.g., mole, acne, birthmark, etc.), costume (including body armor, outfit, clothing, wardrobe, and etc.), accessories (including badge, tattoo, shoulder pads, shoes, eye ware, hat, gloves, watch, and/or any other accessories), and/or any other aspects of physical appearance for the character. In addition, the character representation presented on the physical figure 112 may include verbal communications including narration, commentary, exclamation, verbal interactions, discussion, and/or any other character verbal communications configured through audio. The character representation presented on the physical figure 112 may also include character description, e.g., through animation, movie, and/or text, describing experiences in the virtual space and/or the real-world by the user associated with the character, including a life story, an emotional experience, an emotional theme, an achievement, and/or any other user experience in the virtual space and/or real-world.

The character representation information for presentation on the physical figure 112 may be determined by the character representation module 110 based on the user progress information managed by the user module 108. In some implementations, a range of such character representation information may be created by the provider of the virtual space at a configuration stage of the system 100. For example, graphical art (2D or 3D) of different tattoo, shoulder pads, shoes, eye ware, outfit, body armor and/or any other accessories may be created by the provider and stored on the electronic storage 122 and/or on client computing platform 104. The character representation module 110 may be configured to determine a specific character representation that should correspond to a specific aspect of a user progress. For such determinations, a user-progress table may be established to specify associations between the pre-created character representation information and specific user progresses. By way of non-limiting examples, the user-progress table may specify that 100 social points may correspond to a level 1 tattoo such that upon the user gains 100 social points in the virtual space the level 1 tattoo may be presented on the physical figure 112 associated with that user; 200 social points may correspond to a level 2 tattoo such that upon the user gains 200 social points in the virtual space the level 2 tattoo may be presented on the physical figure 112 associated with that user; and so on.

In some implementations, the character representation module 110 may be configured to determine specific location(s) where the determined character representation information may be presented specifically on the physical figure 112 associated with the user. For such presentation location determinations, presentation location information may be configured into the character representation module 110 by the provider, administrator, moderator, and/or any other entities related to the virtual space. For example, the presentation location information may specify that one or more parts of a physical figure 112 may present character representation information, e.g., a head piece, torso piece, leg pieces, arm pieces, and/or any other parts of the physical figure 112. Based on such presentation location information, the character representation module 110 may be configured to determine certain type(s) of character representation should be presented on a specific part of the physical figure 112. By way of non-limiting examples, the character representation module 110 may determine that a score earned by the user in the virtual space may be presented on the head piece; representation of (e.g., graphical art or image) one or more of armor, outfit, clothing, or wardrobe may be presented on the torso; representation of one or more of an arm sleeve, shoulder pads, or tattoo representing an achievement in real-world learning by the user may be presented on the arm pieces; representation of one or more of pants, shoes, or a tattoo representing an completion of one or more physical activities by the user may be presented on leg pieces of the physical figure 112; and so on.

In some implementations, the character representation module 110 may be configured to determine the character representation information for presentation on the physical figure 112 based on information indicating presentation capability of the physical figure 112. The information indicating the presentation capability of the physical figure 112 may indicate a number of display screens included in or coupled to the physical figure 112, locations of the display screens relative to the physical figure 112, resolution and/or frequency of the individual screens, size and/or shape of the individual screens, individual screen types (e.g., color or black & white) and/or any other display screen information about the physical figure 112. The information indicating the presentation capability of the physical figure 112 may further indicate a number of speakers, audio channels, types of audio supported (e.g., mono or stereo) and/or any other audio capability information about the physical figure 112.

Based on such presentation capability information about the physical figure 112, the character representation module 110 may determine resolution, size, color scheme, sound quality (e.g., 48 bit mono, 96 bit stereo, and so on) and/or any other quality characteristics for the character representation information.

In some implementations, such presentation capability information may be obtained from the client computing platform 104, e.g., when the physical figure 112 is docked to the client computing platform 104. In some implementations, such presentation capability information may be obtained from the physical figure 112 directly at a sampling rate predetermined by the provider, administrator, moderator, and/or any other entities related to the virtual space. Still in some implementations, such presentation capability information may be preconfigured with system 100, e.g., stored on the server 102, and/or on client computing platform 104.

The server 102, client computing platforms 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

A physical figure 112 may comprise a torso piece with a head, arms and legs connected thereto. Examples of the physical figures 112 may include, but not limited to, dolls, mannequins, action figure toys, robots, automata, and/or any other physical figures 112 that may be used to present information indicating user progress in the virtual space. The physical figure 112 may comprise one or more processing units configured to receive character representation information indicating progress of a user in a virtual space. In some implementations, the physical figure 112 may receive the character representation information from the server 102 wirelessly through a wireless network connection with the server 102. Simultaneously and alternatively, the physical figure 112 may be connected to a client computing platform 104 via any suitable connection such as universal system bus (USB), Bluetooth, infrared, just to name a few. In any case, the physical figure 112 may comprise one or more display screens. The display screens may be attached to parts of the physical figure 112 for presentation of character representation information representing different aspects of the user progress in the virtual space. For example, one or more display screens may be attached to the head piece to display experience points and/or any other virtual space score earned by the user in the virtual space; one or more screens may be attached to the torso piece to display armor, outfit, wardrobe, clothing and/or any other torso elements representing an achievement in one or more social relationships by the user; one or more screens may be attached to arm pieces to display arm sleeve, shoulder pad, arm tattoo and/or any other arm elements representing an achievement in learning by the user; one or more screens may be attached to leg pieces to display pants, shoes, leg tattoo and/or any other leg elements representing an achievement in one or more physical activities by the user; and so on. In some implementations, the physical figure 112 may comprise one or more speakers for presentation of audio character representation information determined by the character representation module 110.

External resources 118 may include sources of information, hosts and/or providers of virtual environments outside of system 100, external entities participating with system 100, and/or other resources. In some implementations, some or all of the functionality attributed herein to external resources 118 may be provided by resources included in system 100.

Server 102 may include electronic storage 122, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110 and/or other modules. Processor 120 may be configured to execute modules 106, 108, 110 and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110 are illustrated in FIG. 1 as being implemented within a single processing unit, in implementations in which processor 120 includes multiple processing units, one or more of modules 106, 108, 110 may be implemented remotely from the other modules. The description of the functionality provided by the different modules 106, 108, 110 described below is for illustrative purposes, and is not intended to be limiting, as any of modules 106, 108, 110 may provide more or less functionality than is described. For example, one or more of modules 106, 108, 110 may be eliminated, and some or all of its functionality may be provided by other ones of modules 106, 108, 110. As another example, processor 120 may be configured to execute one or more additional modules that may perform some or all of the functionality attributed below to one of modules 106, 108, 110.

It is understood that the above description of system 100 is merely illustrated as one example of a system configured to facilitate a presentation of user progress on a physical figure. It should be appreciated that in some examples, a localized system 100 may be configured according to a stand-alone architecture such that the system configured to provide rewards to a user in a virtual space based on user performance of gesture in accordance with the disclosure may be localized. For example, the localized system 100 may comprise a processor the same as or similar to the processor 120, e.g., a CPU, a graphical processing unit (GPU), storage, memory, an I/O subsystem, and/or other components included the localized system 100. In those examples, the CPU may be configured to communicate virtual space state information to the GPU through any suitable wired or wireless communications such as, but not limited to, a point-to-point communication like a data bus included in the localized system 100. The GPU may be configured to determine representational view information for presenting instances of virtual space on one or more displays coupled to or included in the localized system 100. It should also be appreciated in some other examples, multiple localized systems 100 may be connected via any wired or wireless links according to a distributed architecture (e.g., peer to peer networks) such that the localized systems 100 may be configured to operate in concert to achieve all or some of the functions of the modules 106, 108, 110, as described above.

Figure 2:
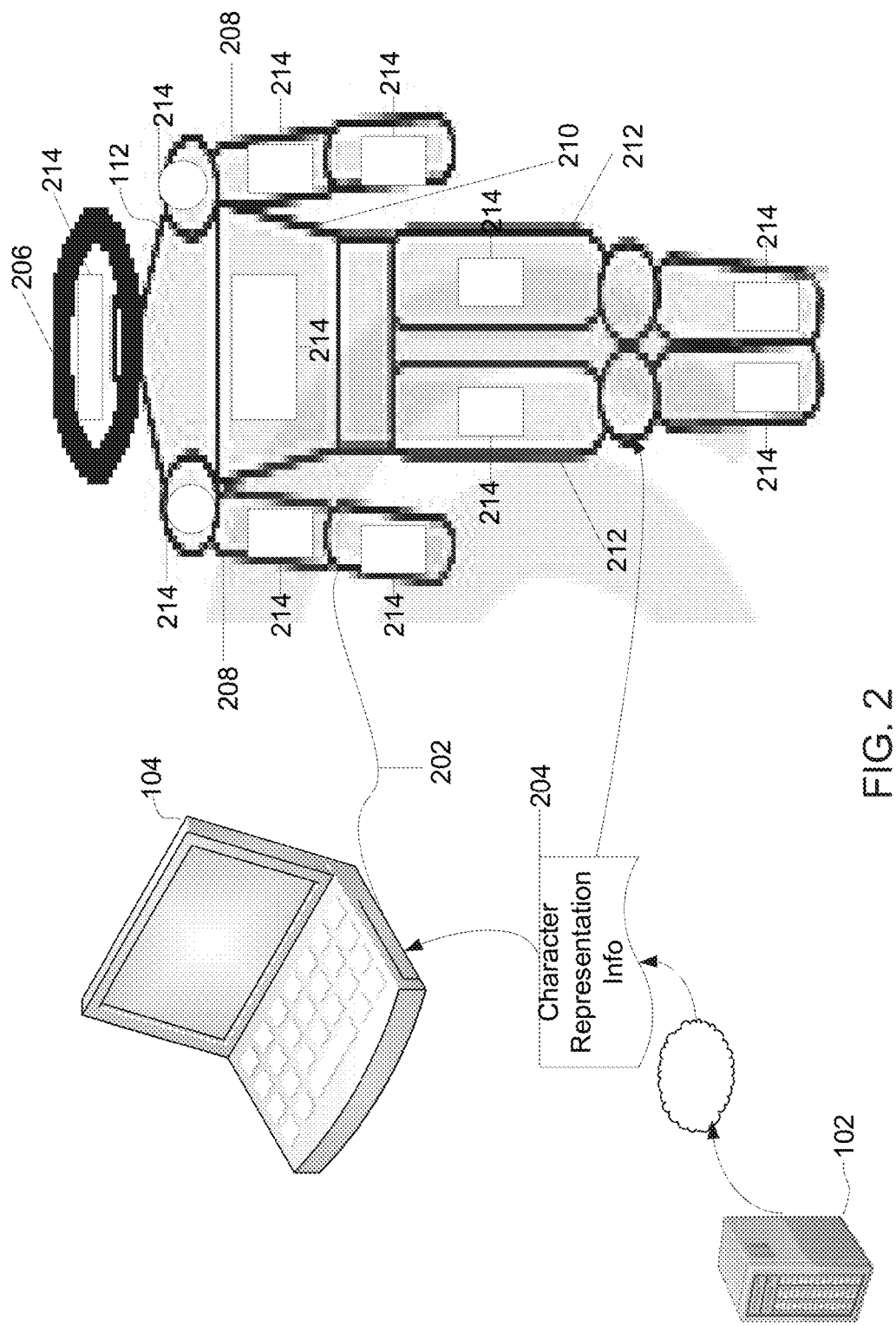
FIG. 2 illustrates an example of presenting character representation information on a physical figure in accordance with the disclosure.

FIG. 2 illustrates an example of presenting character representation information on a physical figure in accordance with the disclosure. It will be described with references to FIG. 1. As shown, the character representation information 204 representing user progress in the virtual space may be determined and transmitted by the server 102, e.g., via the character representation module 110. As shown in this example, the physical figure 112 may be connected to a client computing platform 104 via any suitable point to point link 202, such as, universal system bus (USB) connection, Bluetooth, infrared, and/or any other point to point connection that may facilitate transmission of character representation information 204 from the client computing platform 104 to the physical figure 112. As shown in this example, the character representation information 204 may also be transmitted to the physical figure 112 from the server 102 via any suitable link between the physical figure 112 and the server 102, e.g., but not limited to, a wireless connection. For example, textual character representation information such as game score may be directly transmitted from the server 102 to the physical figure 112 via the wireless connection between the two. As also shown, the character representation information 204 may be transmitted from the server 102 to the client computing platform 104 via any suitable link between the two. For example, graphical art information representing a character's body armor may be transmitted to the client computing platform 104 from the server 102, and the client computing platform 104 may render the body armor via the processors on the client computing platform 104 and transmit the rendered body armor art to the physical figure 112 via the link 202.

As shown, the physical figure 112 includes a head piece 206, arm pieces 208, a torso piece 210, and leg pieces 212 in this example. Also shown are the display screens 214 attached to different parts of the physical figure 112. The display screens 214 on different parts of the physical figure may be configured to present specific character presentation information 204. In this example, the display screen 214 attached to the head piece 206 may be configured to present character representation information 204 representing experience points and/or any other virtual space score earned by the user in the virtual space; the display screen 214 attached to the torso piece 210 is configured to present character representation information 204 regarding armor, outfit, wardrobe, clothing and/or any other torso elements representing an achievement in one or more social relationships by the user; the screens 214 attached to the arm pieces 208 are configured to present character representation information 204 regarding arm sleeves, shoulder pads, arm tattoos and/or any other arm elements representing an achievement in learning by the user; and the screens 214 attached to leg pieces are configured to present character representation information 204 regarding pants, shoes, leg tattoo and/or any other leg elements representing an achievement in one or more physical activities by the user.

Figure 3:
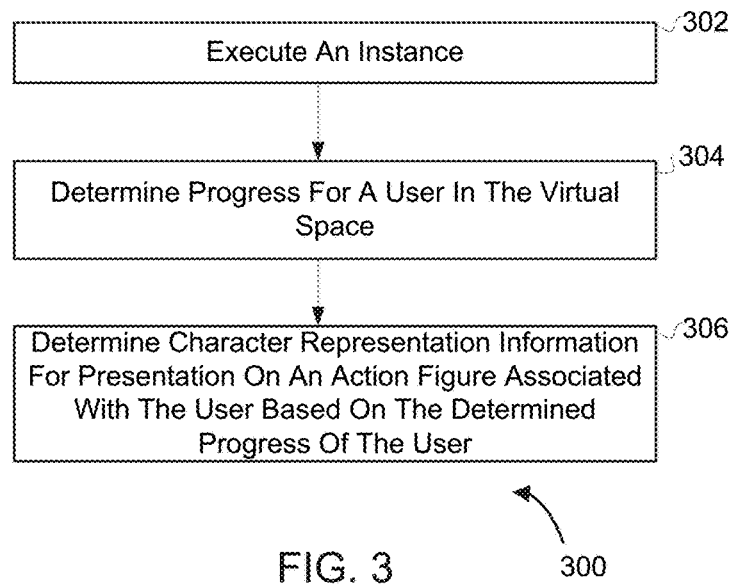
FIG. 3 illustrates an exemplary method of facilitating presentation of user progress on a physical figure.

FIG. 3 illustrates an exemplary method 300 of facilitating presentation of user progress on a physical figure. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of a virtual space may be executed and implemented to determine view information for transmission to one or more client computing platforms associated with users. The users may participate in the virtual space by controlling entities therein. In some implementations, operation 302 may be performed by a space module the same as or similar to space module 106 (shown in FIG. 1 and described herein).

At operation 304, progress for a user may be determined. The determined progress may relate to the user's advancements in the virtual space and/or development in the real-world, such as in areas of social relationships, physical activities, emotional experiences, learning experiences and/or any other real-world experiences of the user. In some implementations, operation 304 may be performed by a user module the same as or similar to user module 108 (shown in FIG. 1 and described herein).

At operation 306, character representation information for presentation on a physical figure associated with the user may be determined based on the user progress determined in operation 304. The determined character representation may include information regarding graphical art (2D and/or 3D), still image, movie, animation, audio, text, and/or any other character representation information. The character representation presented on a physical figure as facilitated by the character representation information may include character's physical appearance, verbal communications, character description and/or any other character representation presentable on the physical figure. In some implementations, operation 306 may be performed by a character representation module the same as or similar to character representation module 110 (shown in FIG. 1 and described herein).

Figure 4:
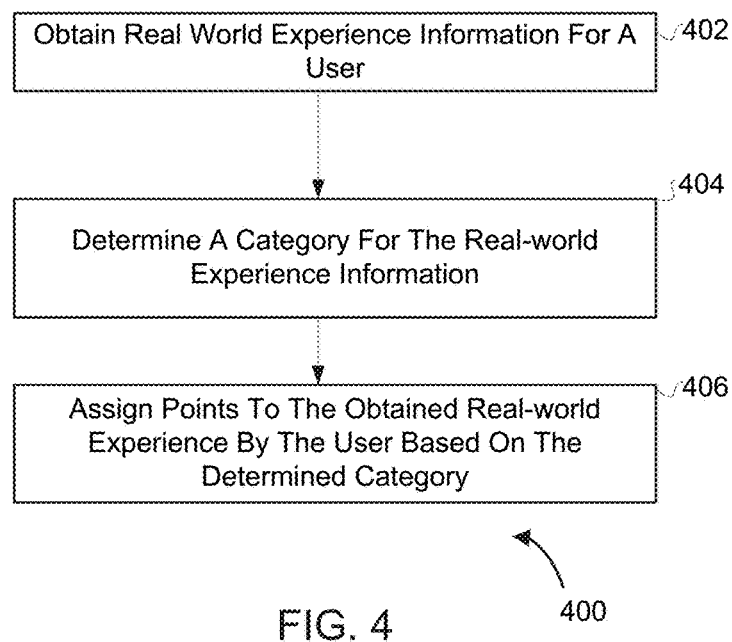
FIG. 4 illustrates an exemplary method of determining user progress in the virtual space based on a user's real-world experiences.

FIG. 4 illustrates an exemplary method 400 of determining user progress in the virtual space based on user's real-world experiences. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, real-world experience information may be obtained for a user. The real-world experience may include social experiences, physical activities, learning experiences, emotional experiences and/or any other real-world experiences by the user in the real-world. In some implementations, operation 402 may be performed by a user module the same as or similar to user module 108 (shown in FIG. 1 and described herein).

At operation 404, a category for the real-world experience information obtained in operation 402 may be determined. For example, the obtained user real-world experiences relating to user social experiences may be categorized as "Connect"; the obtained user real-world experiences relating to physical activities engaged in by the user may be categorized as "Move"; and the obtained user real-world experiences relating to learning by the user may be categorized as "Learn"; and so on. In some implementations, operation 404 may be performed by a user module the same as or similar to user module 108 (shown in FIG. 1 and described herein).

At operation 406, points for the obtained real-world experiences by the user may be assigned to the user based on the category determined in operation 406. For example, "Connect" points may be assigned to social experiences by the user in the real-world; "Move" points may be assigned to physical activities engaged in by the user; and "Learn" points may be assigned to learning experiences engaged in the by the user. In some implementations, operation 406 may be performed by a user module the same as or similar to user module 108 (shown in FIG. 1 and described herein).

Figure 5:
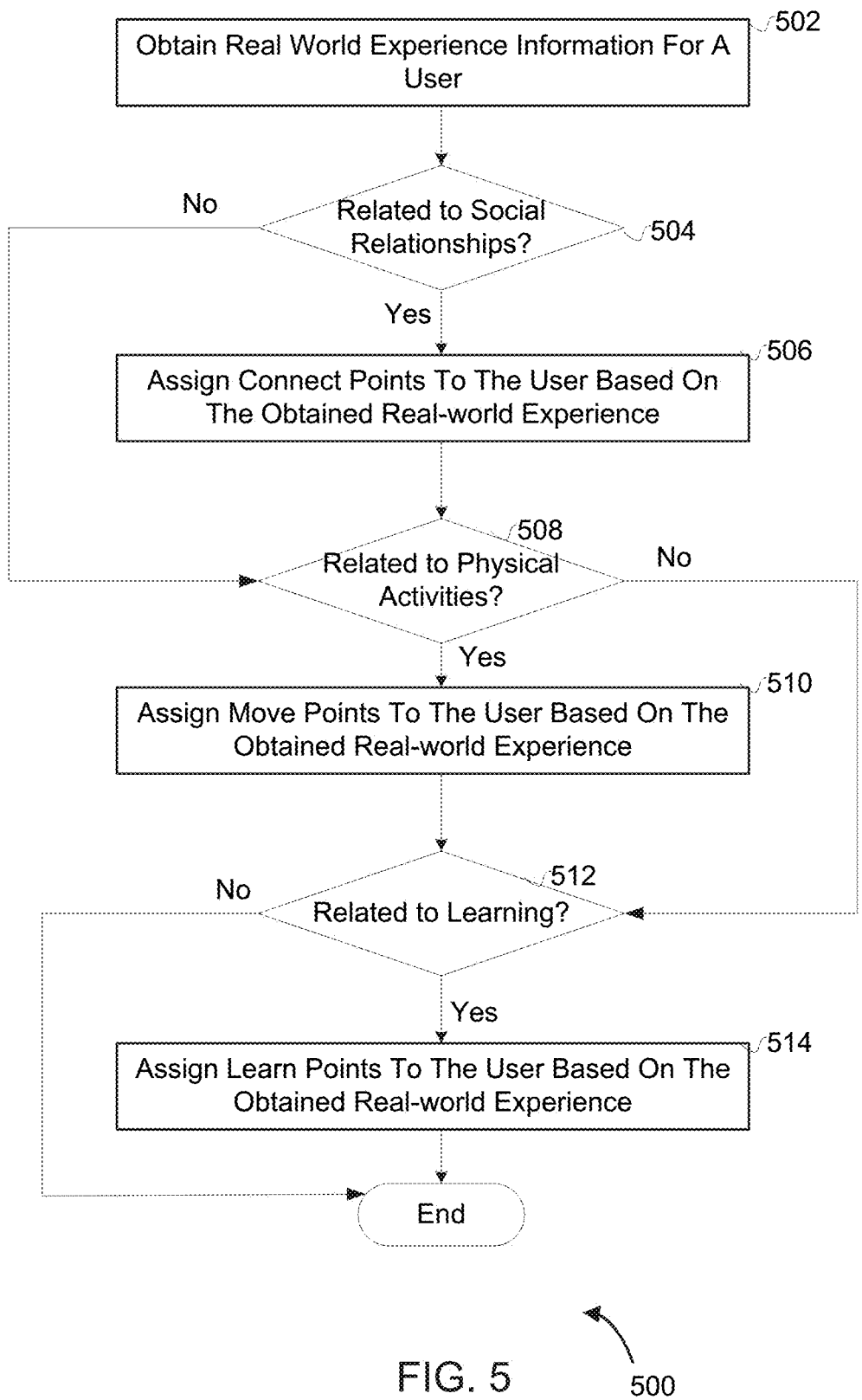
FIG. 5 illustrates another exemplary method of determining user progress in the virtual space based on a user's real-world experiences.

FIG. 5 illustrates another exemplary method 500 of determining user progress in the virtual space based on user's real-world experiences. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 502, real-world experience information may be obtained for a user. The real-world experience may include social experiences, physical activities, learning experiences, emotional experiences and/or any other real-world experiences by the user in the real-world. In some implementations, operation 502 may be performed by a user module the same as or similar to user module 108 (shown in FIG. 1 and described herein).

At operation 504, a decision whether the user experience information obtained in operation 502 relates to social experience by the user may be made. In some implementations, the decision may be made based on information indicating other user review of the obtained user experiences in the real-world and/or based on evidences submitted by the user, such as an image and/or video indicating the user's engagement of the obtained user experience information. In some implementations, operation 504 may be performed by a user module the same as or similar to user module 108 (shown in FIG. 1 and described herein).

At operation 506, it is recognized that the obtained user real-world experience information relates to social experiences by the user in the real-world and "Connect" points are assigned to the user in the virtual space. In some implementations, operation 506 may be performed by a user module the same as or similar to user module 108 (shown in FIG. 1 and described herein).

At operation 508, a decision whether the user experience information obtained in operation 502 relates to physical activities by the user may be made. In some implementations, the decision may be made based on information indicating other user review of the obtained user experiences in the real-world and/or based on evidences submitted by the user, such as an image and/or video indicating the user's engagement of the obtained user experience information. In some implementations, operation 508 may be performed by a user module the same as or similar to user module 108 (shown in FIG. 1 and described herein).

At operation 510, it is recognized that the obtained user real-world experience information relates to physical activities engaged in by the user in the real-world and "Move" points are assigned to the user in the virtual space. In some implementations, operation 510 may be performed by a user module the same as or similar to user module 108 (shown in FIG. 1 and described herein).

At operation 512, a decision whether the user experience information obtained in operation 502 relates to learning experiences by the user may be made. In some implementations, the decision may be made based on information indicating other user review of the obtained user experiences in the real-world and/or based on evidences submitted by the user, such as an image and/or video indicating the user's engagement of the obtained user experience information. In some implementations, operation 512 may be performed by a user module the same as or similar to user module 108 (shown in FIG. 1 and described herein).

At operation 514, it is recognized that the obtained user real-world experience information relates to learning experience by the user in the real-world and "Learn" points are assigned to the user in the virtual space. In some implementations, operation 514 may be performed by a user module the same as or similar to user module 108 (shown in FIG. 1 and described herein).

Figure 6:
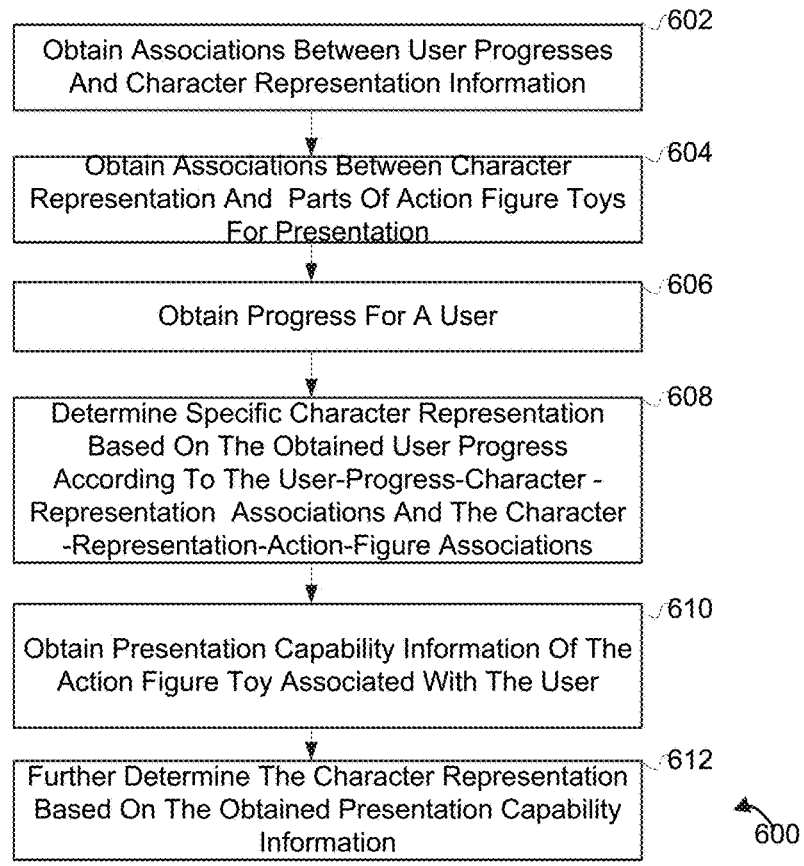
FIG. 6 illustrates an exemplary method of determining character representation based on user progress in the virtual space.

FIG. 6 illustrates an exemplary method 600 of determining character representation based on a user progress in the virtual space. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At operation 602, associations between user progresses and character representations may be obtained. In some examples, a user-progress table specifying associations between the pre-created character representation information and specific user progresses may be obtained. In some implementations, operation 602 may be performed by a character representation module the same as or similar to character representation module 110 (shown in FIG. 1 and described herein).

At operation 604, associations between character representation and corresponding locations on a physical figure for presentation of the character representation may be obtained. For example, a character representation physical figure table may be obtained such that the table specifies that character representation information representing user achievements in social experiences in the real-world may be presented on a torso piece of the physical figure; character representation information representing user achievements in physical activities in the real-world may be presented on arm pieces of the physical figure; and character representation information representing user achievements in learning experiences in the real-world may be presented on leg pieces of the physical figure. In some implementations, operation 604 may be performed by a character representation module the same as or similar to character representation module 110 (shown in FIG. 1 and described herein).

At operation 606, a user progress in the virtual space may be obtained. The obtained user progress may relate to the user's advancements in the virtual space and/or development in the real-world, such as in areas of social relationships, physical activities, emotional experiences, learning experiences and/or any other real-world experiences of the user. In some implementations, operation 606 may be performed by a character presentation module the same as or similar to character representation module 110 (shown in FIG. 1 and described herein).

At operation 608, specific character representation may be determined based on the user progress obtained in operation 606 according to the associations obtained in operations 602 and 604. In some implementations, operation 608 may be performed by a character presentation module the same as or similar to character representation module 110 (shown in FIG. 1 and described herein).

At operation 610, presentation capability information of the physical figure may be obtained. The physical figure presentation capability information may indicate a number of display screens included in or coupled to the physical figure, locations of the display screens relative to the physical figure, resolution and/or frequency of the individual screens, size and/or shape of the individual screens, individual screen types (e.g., color or black & white) and/or any other display screen information about the physical figure. In some implementations, operation 610 may be performed by a character presentation module the same as or similar to character representation module 110 (shown in FIG. 1 and described herein).

At operation 612, character representation for presentation on the physical figure may be further determined based on the presentation capability information obtained in operation 610. For example, based on the obtained presentation capability information about the physical figure, resolution, size, color scheme, sound quality (e.g., 48 bit mono, 96 bit stereo, and so on) and/or any other quality characteristics for the character representation information may be determined. In some implementations, operation 612 may be performed by a character presentation module the same as or similar to character representation module 110 (shown in FIG. 1 and described herein).

Figure 7:
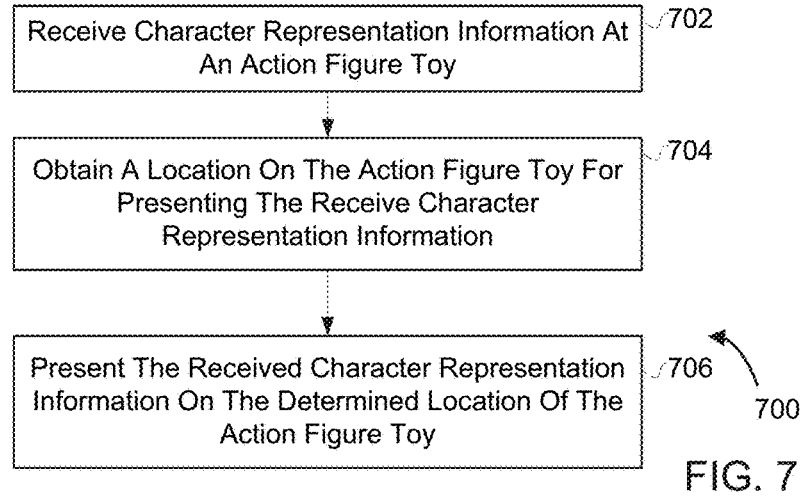
FIG. 7 illustrates an exemplary method of presenting character representation representing user progress in a virtual space on a physical figure.

FIG. 7 illustrates an exemplary method 700 of presenting character representation representing user progress in a virtual space on a physical figure. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At operation 702, character representation information representing user progress in the virtual space may be received at a physical figure. In some implementations, operation 702 may be performed by the processing unit of the physical figure described herein.

At operation 704, a location on the physical figure for presenting the character representation information received in operation 702 may be obtained. For example, the character representation information representing user achievements in social experiences in the real-world may be presented on a torso piece of the physical figure; character representation information representing user achievements in physical activities in the real-world may be presented on arm pieces of the physical figure; and character representation information representing user achievements in learning experiences in the real-world may be presented on leg pieces of the physical figure. In some implementations, operation 704 may be performed by the processing unit of the physical figure described herein.

At operation 706, the character representation may be presented at the location on the physical figure as determined in operation 704. In some implementations, operation 706 may be performed by the display screen(s) of the physical figure described herein.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A physical figure, comprising:
    a head piece;
    one or more body pieces connected to the head piece;
    at least one display screen; and
    one or more processing devices configured to:
        receive graphical art configured to alter at least a physical appearance of the physical figure, wherein the graphical art is transmitted to the physical figure as a virtual reward to indicate progress that a user has made towards completing one or more objectives defined in a virtual space, the virtual reward further affecting a physical appearance of a user character in the virtual space; and
        render the graphical art on the at least one display screen such that the physical appearance of the physical figure is altered to reflect the physical appearance of the user character in the virtual space.

2. The physical figure recited claim 1, wherein the graphical art has an image quality that depends on a presentation capability associated with the at least one display screen.

3. The physical figure recited claim 1, further comprising one or more speakers, wherein the one or more processing devices are further configured to:
    receive audio content configured to alter verbal communications of the physical figure, wherein the audio content is transmitted to the physical figure as a second virtual reward to indicate the progress that the user has made towards completing the one or more objectives defined in the virtual space, the second virtual reward further affecting verbal communications of the user character in the virtual space; and
    render the audio content via the one or more speakers such that the verbal communications of the physical figure are altered to further reflect the verbal communications of the user character in the virtual space.

4. The physical figure recited claim 3, wherein the audio content has a sound quality that depends on a presentation capability associated with the one or more speakers.

5. The physical figure recited claim 1, wherein the one or more objectives are defined in the virtual space to facilitate real-world development of the user.

6. The physical figure recited claim 1, wherein the at least one display screen comprises:
    a first display screen attached to the head piece; and
    at least one second display screen attached to each of the one or more body pieces, wherein the at least one display screen configured to render the graphical art comprises one or more of the first display screen or the at least one second display screen.

7. The physical figure recited claim 1, wherein the graphical art is rendered on one or more of the head piece or the one or more body pieces depending on a type of progress made towards completing the one or more objectives.

8. The physical figure recited claim 7, wherein the type of progress is one or more of a real-world skill acquired by the user, a real-world personality growth by the user, a real-world physical activity performed by the user, a real-world emotional experience by the user, or a real-world social network connection made by the user.

9. The physical figure recited claim 7, wherein a table specifies an association between the type of progress and an aspect of the physical appearance of the physical figure to be altered by the graphical art.

10. A physical figure, comprising:
    a head piece;
    one or more body pieces connected to the head piece;
    one or more speakers; and
    one or more processing devices configured to:
        receive audio content configured to alter at least verbal communications of the physical figure, wherein the audio content is transmitted to the physical figure as a virtual reward to indicate progress that a user has made towards completing one or more objectives defined in a virtual space, the virtual reward further affecting verbal communications of a user character in the virtual space; and
        render the audio content via the one or more speakers such that the verbal communications of the physical figure are altered to reflect the verbal communications of the user character in the virtual space.

* * * * *